United States Patent [19]

Canziani

[11] Patent Number: 4,722,430

[45] Date of Patent: Feb. 2, 1988

[54] CARRIAGE FOR SORTING-MACHINES IN PARTICULAR, WITH INDEPENDENTLY ACTIONED TILTABLE PLATE

[76] Inventor: Francesco Canziani, Via Contardo Ferrini, 21, 21010 San Macario, Italy

[21] Appl. No.: 13,325

[22] Filed: Feb. 11, 1987

Related U.S. Application Data

[63] Continuation of Ser. No. 695,490, Jan. 28, 1985, abandoned.

[30] Foreign Application Priority Data

Feb. 3, 1984 [IT] Italy .............................. 20722/84[U]

[51] Int. Cl.4 ............................................. B65G 47/46
[52] U.S. Cl. .................... 198/365; 198/370; 198/372; 198/477.1; 198/802; 105/271
[58] Field of Search ............ 198/365, 370, 372, 464.3, 198/476.1, 477.1, 631, 802, 482.1; 414/136, 748; 105/261.1, 270, 271

[56] References Cited

U.S. PATENT DOCUMENTS

| | | | |
|---|---|---|---|
| 1,413,946 | 4/1922 | Stebbins | 105/271 |
| 2,608,163 | 8/1952 | Martin . | |
| 2,617,365 | 11/1952 | Martin . | |
| 3,231,068 | 1/1966 | Harrison et al. | 198/365 |
| 3,727,560 | 4/1973 | Blemly et al. . | |
| 3,848,728 | 11/1974 | Leibrick et al. . | |
| 3,912,071 | 10/1975 | Nielsen | 198/365 |
| 3,935,822 | 2/1976 | Kaufmann . | |
| 3,977,513 | 8/1976 | Rushforth . | |
| 4,239,434 | 12/1980 | Gannon | 414/136 |
| 4,318,346 | 3/1982 | Sessum . | |
| 4,399,904 | 8/1983 | Canziani | 198/365 |

FOREIGN PATENT DOCUMENTS

| | | | |
|---|---|---|---|
| 2037380 | 1/1972 | Fed. Rep. of Germany | 198/365 |
| 52-2973 | 1/1977 | Japan . | |
| 595599 | 12/1947 | United Kingdom . | |
| 622144 | 4/1949 | United Kingdom . | |
| 683699 | 12/1952 | United Kingdom . | |
| 2014933 | 9/1979 | United Kingdom . | |
| 2025343 | 1/1980 | United Kingdom . | |
| 2078187 | 1/1982 | United Kingdom . | |
| 2110448 | 6/1983 | United Kingdom . | |
| 2111933 | 7/1983 | United Kingdom | 198/365 |
| 2113633 | 8/1983 | United Kingdom . | |
| 2141680 | 1/1985 | United Kingdom . | |

Primary Examiner—Joseph E. Valenza
Assistant Examiner—Jonathan D. Holmes
Attorney, Agent, or Firm—Ladas & Parry

[57] ABSTRACT

A carriage for a transport and sorting machine having tracks and a carriage-dragging device therealong has a carriage support. The carriage support is dragged along the tracks by the carriage-dragging device, but a tiltable object-carrying plate on the carriage support is tilted by an electric motor on the carriage support and movable therewith.

1 Claim, 7 Drawing Figures

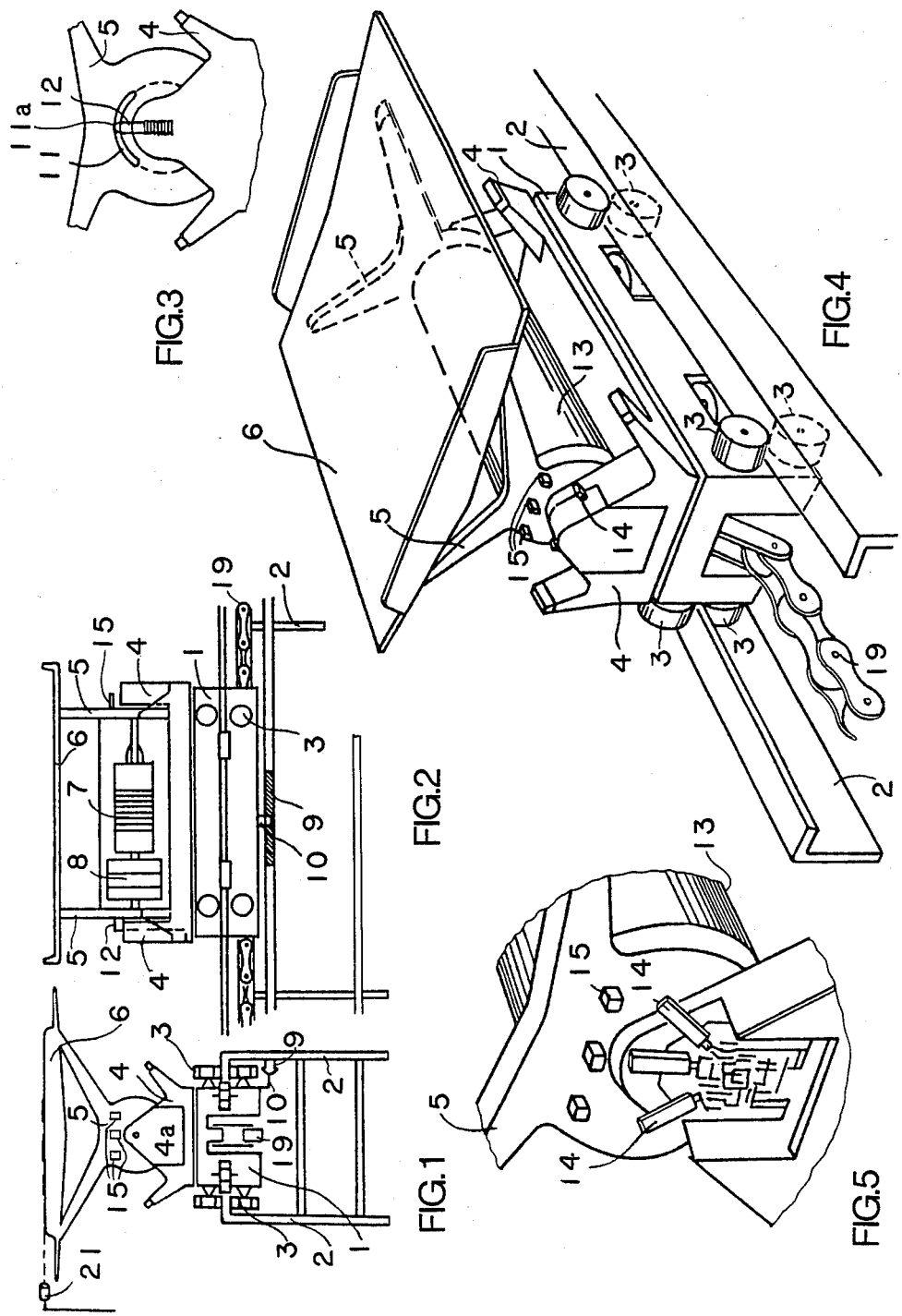

CARRIAGE FOR SORTING-MACHINES IN PARTICULAR, WITH INDEPENDENTLY ACTIONED TILTABLE PLATE

This is a continuation of co-pending application Ser. No. 695,490, filed on Jan. 28, 1985, now abandoned.

The present invention provides an object-transporting carriage for a transport and sorting machine having, in particular, an electrically tiltable plate for independently unloading, i.e. sorting, objects thereon precisely and silently.

Various kinds of sorting apparatuses consisting of a series of conveyor or transport carriages dragged along a fixed path or track and equipped with planar, object-carrying plates arranged for unloading the objects at pre-determined collecting or sorting stations located along the path or track are known.

These apparatuses are employed whenever there is need to sort a large number of items per hour, (for instance in post offices or in laboratories for conditioning products).

Some of them have a pusher element mechanically driven over an object carrying plate by guides located underneath the plate for the unloading.

Others have tiltable, object-carrying plates on carriages dragged along by chains or flexible belts, for instance.

In the latter, the plate is mechanically tilted by cams or other mobile guides, interacting lever systems, or other devices connected to rotate or pivot the plate about hinged support from the carriage.

This system presents, however, some inconveniences. For one, it is very noisy, making the working conditions noxious for the operators. For another, cam plate tilting devices must overcome inertias, mechanical resistances and frictions, so that it becomes necessary to oversize both the carriage dragging devices which also operate the plate-tilting devices and the support structures.

This results in higher costs and uses greater floor space. Yet another lies in the considerable wear they are subjected to, so that they should be frequently repaired or kept up.

In order to obviate the above inconveniences, the present invention provides a carriage for a transport and sorting apparatus equipped with independent means for causing its plate to tilt, preferably an electric motor or the like linked to the plate and fed e.g., by sliding contacts and feed rods at both sides of its path. In this manner, quick, precise and silent operation is obtained, and it is possible to properly size both the support structures and the carriage dragging devices. It leads to saving space and to a remarkable reduction of maintenance operations.

The present invention will be now described in detail, with special reference to the accompanying drawings, in which:

FIG. 1 is a front view of part of a carriage according to the invention;

FIG. 2 is a side view of the carriage of FIG. 1, partly in section;

FIG. 3 is an enlarged rear view of a portion of the carriage of FIG. 1;

FIG. 4 is the perspective view of the carriage of FIG. 1;

FIG. 5 is an enlarged perspective view of a front portion of the carriage of FIG. 1;

Figure 6:
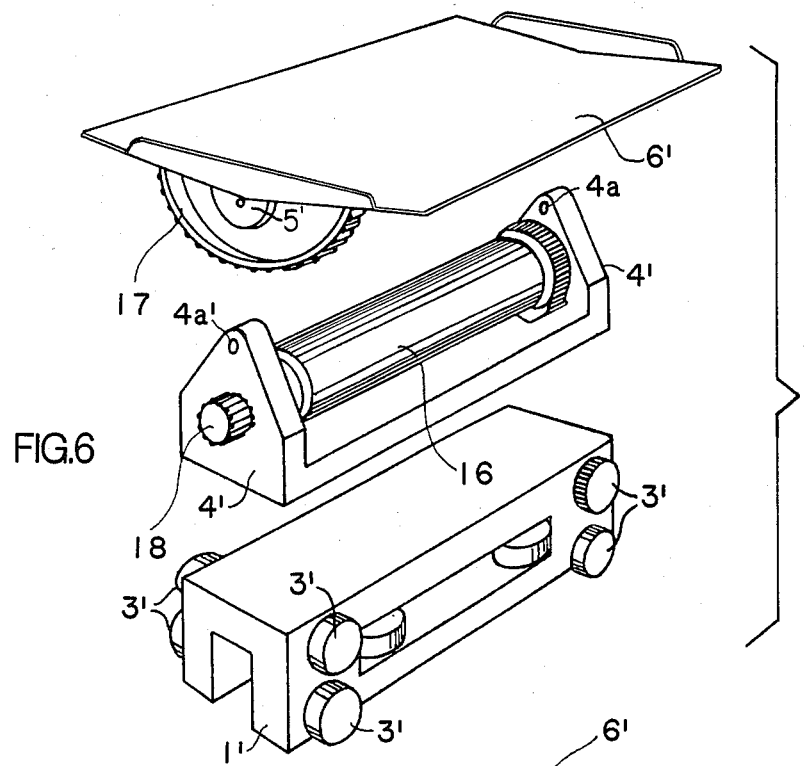
FIG. 6 is a perspective schematic, exploded view of another carriage according the invention.

The carriages according to the invention shown in the drawings each have a carriage support 1,1' that can run along frames or tracks 2,2' of a respective sorting apparatus carriage on freely-rotatable wheels, rollers or the like 3,3'.

At opposite, front and rear ends of each carriage ends of support 1,1' there is a pair of uprights 4,4', on which respective hinges 4a, 4a' tiltably support plate supports 5,5' for a plate 6,6' therebetween.

Below the plate 6 and between the supports 5 in the carriage according to FIGS. 1 to 5 is a motor-reducer unit, which makes plate 6 tilt. Its motor 7 will be, preferably, of the self-braking electric kind, and its reducer 8 will be, preferably, axially in line with motor 7.

Electric feed to the motor 7 takes place through conducting rods 9 (only one shown) spaced along one of the tracks 2 for the carriage and a sliding contact 10 therefor fixed to the carriage support 1.

Particularly fit is a permanent magnet direct current motor 7 having distinct acceleration characteristics allowing precise control of plate rotation.

One of the supports 5 for the plate 6 has an opening 11 (FIG. 2) with a seat 11a for a pin 12 (or the like) for locking the plate in an horizontal position.

There are also, therefore, devices (not shown) of known type, e.g. an electromagnetic, for unlocking the support for tilting the plate.

Having the motor 7 and reducer 8 in line saves space to a certain extent, and allows both to be held inside a single preferably cylindrical container 13. The container protects these parts against dust or other foreign bodies.

To stop tilting the plate, micro-switches 14 or the like spaced on one upright 4 are actuated by cams 15 secured to one of the supports 5 for the plate.

In the carriage of FIGS. 5 and 6, a step-by-step motor 16 is used in place of motor 7 and reducer 8. It is directly linked to place 6' by an arc of a pinion-cooperative hoop 17 secured to the plate 6' and a pinion 18 mounted on a shaft of motor 16.

Operation of either carriage (with reference, too, to a few further details) takes place as follows The carriage is dragged along frames or tracks 2,2' of the sorting machine by a chain 19 (FIG. 3) or a belt 20 (FIG. 6) driven by a central motor (not shown). As each carriage passes before loading and coding zones (not shown), the operator lays the article to be sorted down on plate 6,6' and makes a known coding for directing the object towards a thereby selected collecting zone.

Figure 7:
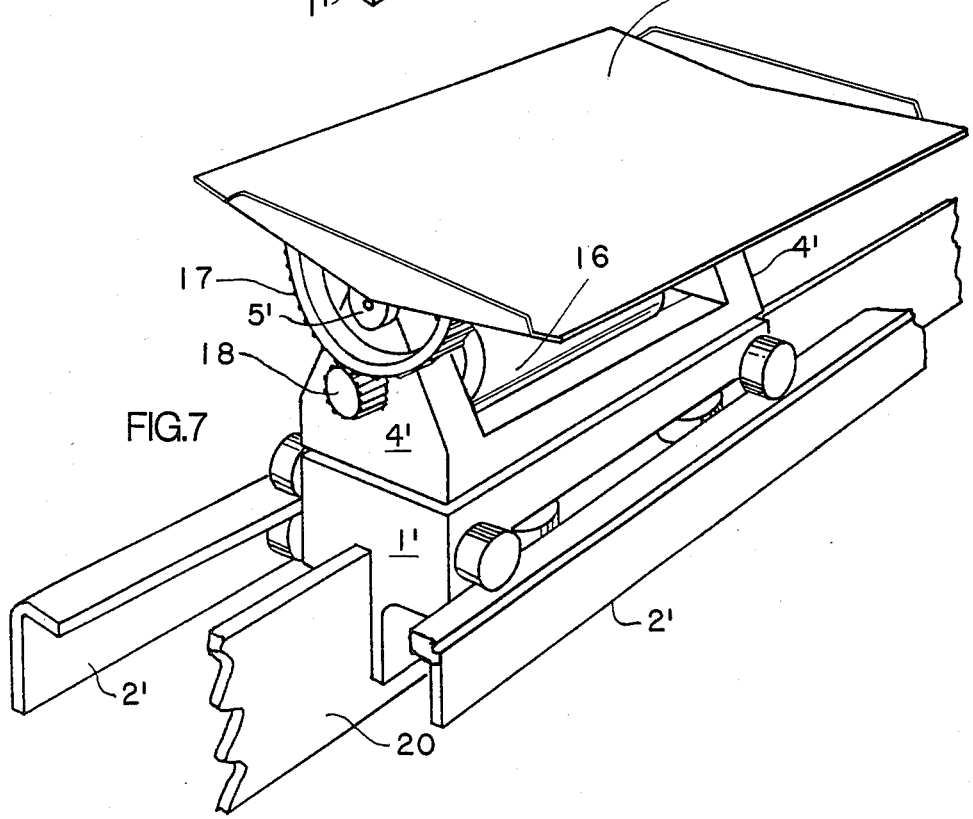
FIG. 7 is another perspective view of the carriage of FIG. 6.

A microprocessor (not shown) programs the whole apparatus, sending electric feed to the conducting rod 9 (not shown for the carriage of FIGS. 6 and 7) when the carriage passes that selected collecting zone.

The motor 7, 16 then takes current from the conducting rod 9 through sliding contact 10, causes the plate 6,6' and supports 5,5' to tilt and, thus, unloads the object.

At the end of such a tilting stroke with the carriage of FIGS. 1 to 5, a cam 15 acts on a microswitch 14 to stop the stroke and automatically control reverse tilt until plate 6 is brought back to the horizontal position shown. This is checked by a photocell 21 or an analogous known system connected to control the motor 7, too. In the case of the step-by-step motor 16 of the carriage of FIGS. 6 and 7, the cell 21 is obviously unnecessary, as this kind of motor permits exact tilting rotation.

The advantages of the particular arrangements of the parts of the carriages according to the described above are clearly visible. First of all, electrically tilting the plate makes the structure considerably lighter and allows the carriage to reach much higher speeds without damage or wear from the impacts of the various mobile parts.

Further, as already said, it is possible to properly size both the support structures and the dragging device, such as chain 19 or belt 20, and consequently also the main dragging motor. Lastly, besides obtaining more-precise operation even at high speeds, the noise of the whole is remarkably reduced.

Obviously, sizes and materials may vary according to the different requirements of use.

I claim:

1. In a carriage for a sorting machine, the sorting machine having at least one track, a carriage-dragging device movable therealong, and at least one electric conducting rod along the track at a collecting zone of the sorting machine, and the carriage having a carriage support and freely-rotatable wheels on the carriage support for running along the track, the carriage support being connected to the carriage-dragging device for running along the track with the movement of the carriage-dragging device, the improvement comprising, in combination:

a pair of uprights on the carriage support;
   a pair of plate supports;
   a pair of hinges respectively supporting the plate supports tiltably on the uprights;
   a plate supported by the plate supports;
   a rotatable pinion on at least one of the uprights;
   an arc of a pinion cooperative hoop extending from the plate for engagement with the pinion, whereby to tilt the plate upon rotation of the pinion;
   a step-by-step motor on the carriage support between the uprights for selectively rotating the pinion; and
   a sliding contact on the carriage support for slidingly contacting the conducting rod when the carriage-dragging device moves the carriage therepast and conducting current from the conducting rod to the motor, whereby to rotate the pinion and tilt the plate, the tilt of the plate allowing objects to slide from the plate at the selected collecting zone.

* * * * *